DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 2, 1974

924 O.G. 7

T924,004

PROCESS FOR TREATING ESSENTIALLY AMORPHOUS POLYESTER COATING COMPOSITIONS

Peter M. Grant, Rte. 16 37663, and Michael L. Whitt, P.O. Box 3029 37664, both of Kingsport, Tenn.

Filed Sept. 27, 1973, Ser. No. 401,326

Int. Cl. B29f *3/08*

U.S. Cl. 264—234

No Drawing. 6 Pages Specification

The invention disclosed herein comprises treating an essentially amorphous polyester to render it more grindable and comprising the steps of extruding an essentially amorphous polyester at a temperature no greater than 400° F. and heat treating the extruded polyester at a temperature of 150° F. to 250° F. for about 1 minute to about 6 hours. The polyester should be an amorphous polymer containing not more than 10% crystallinity in which the acid component is terephthalic and/or isophthalic acid and the glycol component is selected from ethylene glycol, butylene glycol, neopentyl glycol, and cyclohexanedimethanol. The essentially amorphous polymer may contain plasticizers, flow aids, stabilizers and pigments useful in compounding powder coating compositions.